Figure 1:
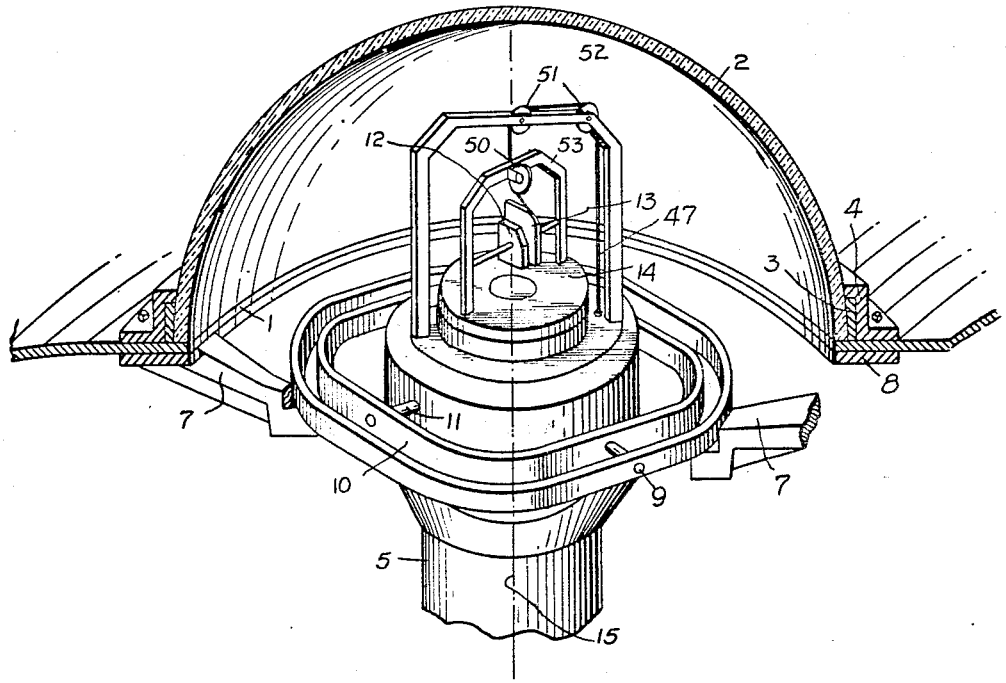

Sept. 26, 1950  R. LAVERDURE  2,523,577
PERISCOPIC POINTING DEVICE

Filed March 1, 1948  3 Sheets-Sheet 1

Robert Laverdure
*INVENTOR.*

BY Richardson, Dawden Nordon
his Attys.

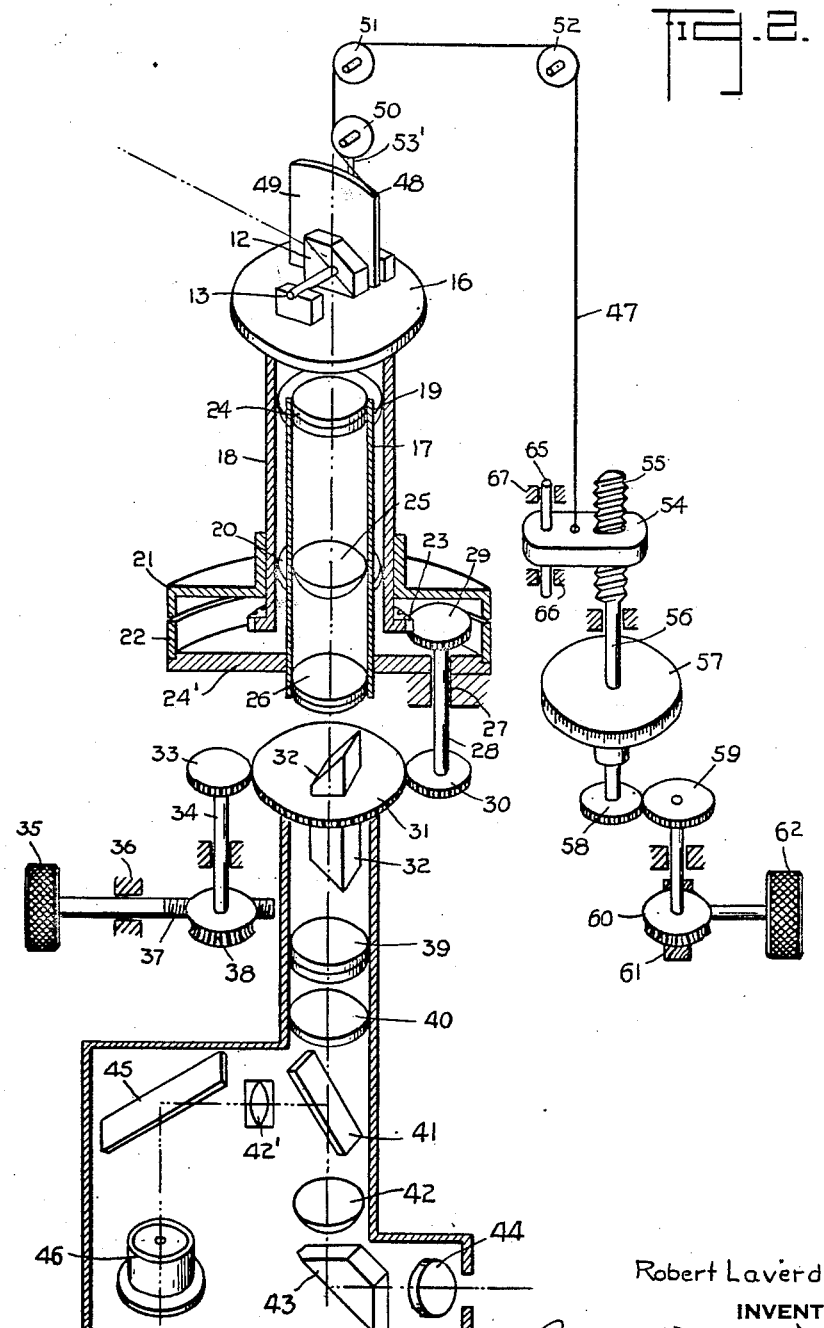

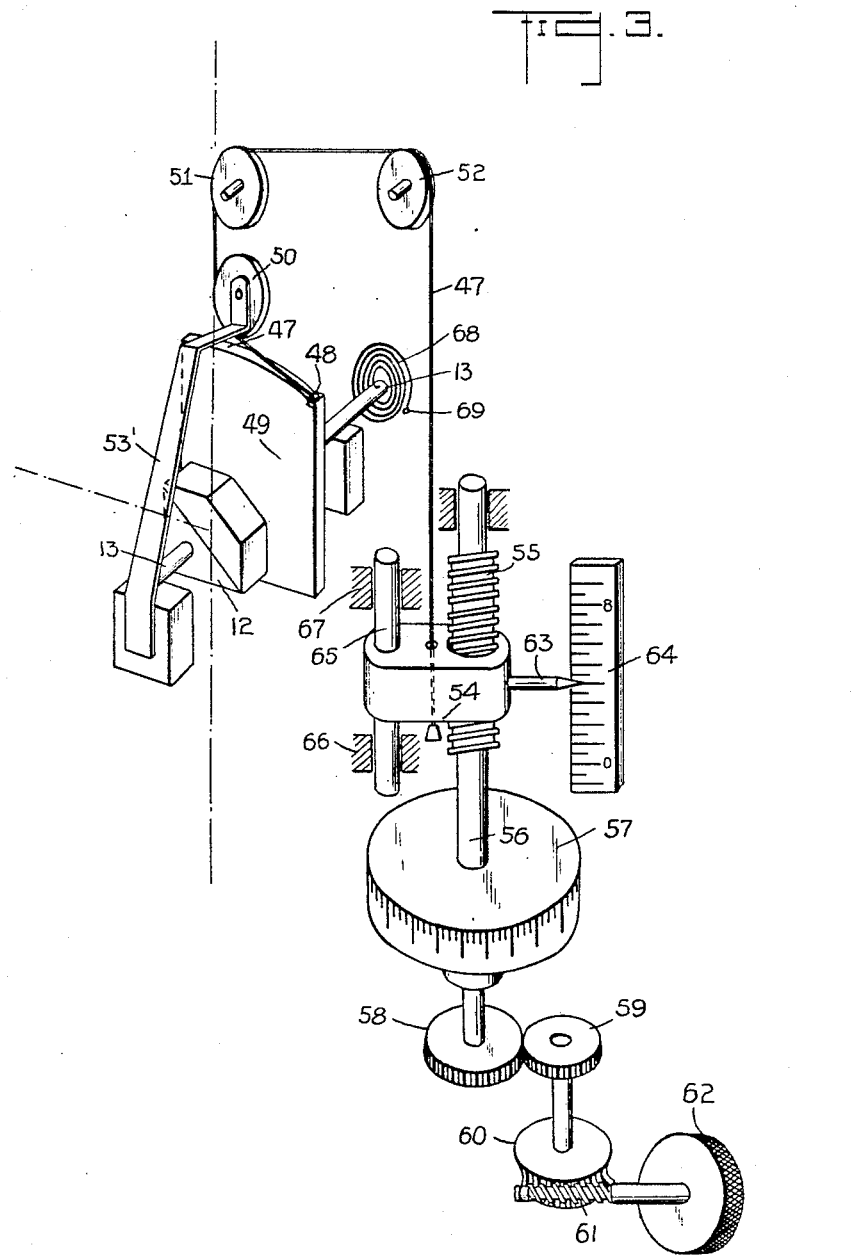

Patented Sept. 26, 1950

2,523,577

UNITED STATES PATENT OFFICE 2,523,577

PERISCOPIC POINTING DEVICE

Robert Laverdure, Aubagne, France

Application March 1, 1948, Serial No. 12,415
In France January 7, 1947

3 Claims. (Cl. 88—2.4)

The present invention relates to an improved periscopic pointing device, namely applicable to the aircraft. The first important object of the invention is to provide a device of the type specified which enables to take aims in all directions perpendicular to the periscopic system, and this without changing the position of the eye-piece and consequently of the observer.

Another important object of the invention is to provide a device which not only enables to take aim in all directions perpendicular to the periscopic system without changing the position of the eye-piece and of the observer, but it also enables to take aim in all the planes passing through the axis of the periscopic system and namely in the whole hemisphere the base of which is constituted by the sight plane perpendicular to the said axis.

According to the present invention, this result is obtained by the use of a small search-prism placed under a transparent optical dome, which dome is fitted in the shell of the flying engine, the search-prism being so arranged as to be able to move angularly in the plane passing through the axis of the periscopic system, the latter system being in its turn free to rotate around the above axis.

An important feature of the device according to the present invention, is that the search-prism is associated with an optical arrangement the bulk of which remains fixed, except for a kind of redresser-prism of a Wollaston type which turns simultaneously with the search-prism round the axis of the periscopical system, being driven by appropriate pointing-gear appliances.

The present invention is moreover characterised by a particular driving-gear for orientation of the search-prism in the vertical plane passing through the axis of the periscopic device, this driving-gear being so conceived as to enable the search-prism, in spite of its permanent mechanical connection with its driving-gear, to turn freely round the main optical axis of the system without incurring an error in its position in the horizontal plane.

According to the present invention, the driving-gear of the search-prism for its orientation in the vertical plane passing through the axis of the periscopic device is based on the principle of using a metal wire one end of which is securely connected to an organ fixed to the search-prism and running over a pulley-block disposed in the plane of the search-prism and moving with the same around the main axis of the periscopic device, the wire falling in line with the same axis and being sent back over other pulley-blocks running loose on their fixed spindles.

Another feature of the present invention is that the angular orientation of the search-prism in the plane passing through the main axis of the periscopic device is operated by a device comprising an endless screw and its nut, one end of the wire being fastened to this nut and the other end being anchored in a sector set fixedly on the search-prism shaft.

The present invention is also characterised by use of an adjustable tension spring in order to adjust the wire tension of the search-prism driving-gear, this spring may be mounted on the search-prism shaft, another end of it being anchored to a point the position of which is adjustable.

The pointing device, according to the present invention, applies quite particularly well to realisation of a periscopic sextant, what is also one of the objects of the invention.

In this embodiment, the periscopic device is suspended by universal joint contrivance in the upper ceiling of the airplane, the axis of the periscope being directed vertically; in this case, the driving-gear of the search-prism becomes the driving-gear of the azimuth and sight pointing, the latter appliances being associated with appropriate gauges for reading the azimuth and the sight of the planet pointed at.

The device according to the invention may also be used for realisation of a periscopic derivometer, in which case the device can be turned upside down 180° and fitted in the floor of the airplane, in order to explore the ground beneath the airplane in all the azimuth planes.

The present invention and its various characteristics and features will more clearly appear from a detailed description which follows and from the drawings attached herewith, it being understood that these drawings are simply given as examples which in no way limit the invention.

In these drawings, the Fig. 1 shows a partial perspective view of the upper part of the periscopic pointing device and the means of fitting of the same in the ceiling of the aircraft, the pointing device being shown here as applied in the case of embodiment as a periscopic sextant.

The Fig. 2 is a schematic view showing the details of the whole pointing device when embodied as a periscopic sextant;

The Fig. 3 is a view, on an enlarged scale, of the driving-gear and of the reading gauge of the sight pointing position of the device shown on the Fig. 2.

Referring to the drawings, the Fig. 1 shows in perspective and partially in section a means of fitting of the device according to the invention embodied in form of the periscopic sextant and fitted in the upper portion or ceiling of the shell of a stratospheric airplane. As it is shown on this figure, an opening 1 is cut in the ceiling of the aircraft shell, which opening is covered by a transparent optical spherical dome 2. The dome is fastened to the edge of the opening 1 so as to form an air-tight joint. This joint may be formed by any convenient contrivance, such as, for instance, an air-tight packing 3 and a circular metal ring of an appropriate section 4 pressing tightly from outside the above packing to the edge of the dome and fastened by rivets or otherwise to the airplane shell.

In the center of the opening 1 cut in the ceiling of the aircraft shell is fitted, by means of a double universal joint suspension, the periscopic sextant the body of which is designated by a reference numeral 5. The universal joint suspension comprises an outer ring 6 resting on the sockets 7 of an elastic ring suspension 8 fastened from inside to the opening edge of the airplane shell ceiling. The outer joint ring 6 bears, by means of studs 9, the inner ring 10, which latter ring supports the body of the periscopic sextant 5 by means of studs 11 disposed perpendicularly to the axes of the studs 9. In this way, the periscopic sextant 5 may freely bend relatively to the airplane in turning round these two couples of horizontal axes of the studs of the universal joint suspension, the said two axes being perpendicular to each other.

As it is shown in detail in the Fig. 2, the sextant according to the invention comprises a small search-prism 12 situated on top of the periscopic device and which permits to point through the dome 2. To this effect, the search-prism 12 is mounted on a horizontal shaft 13 round which it may turn angularly in a vertical plane, the shaft 13 being in its turn associated through its bearings with the lid 14 (Fig. 1) of the periscopic device and which lid turns with the body 5 of the periscopic device round the central vertical axis thereof, so that the search-prism 12 may be oriented in all the azimuth directions while turning round the main optical axis of the periscopic device.

According to the present invention, the orientation of the search-prism 12 in all azimuth directions may be effected without involving a rotation of the whole periscopic device round its vertical axis, and consequently the pointing in all the azimuth direction may be effected without a change of place for the observer.

This result is achieved by disposing the search-prism 12 above a fixed optical system having a vertical axis and borne by a supporting tube which may turn round the said vertical axis; the above optical system comprises a redresser prism of Wollaston type and mounted so as to turn round the same axis coinciding with the main optical axis of the periscopic device, the rotation of the redresser-prism being synchronised with the azimuth rotation of the search-prism 12.

As it is shown in detail on the Fig. 2, the search-prism 12 is borne, by means of the bearings of the shaft 13, by the supporting plate 16, and the search-prism 12 is thus maintained over a lens set in the upper part of the optical system encased in the fixed tube support 17. The plate 16 is fastened to the concentric tube 18 encasing the supporting tube 17 by means of anti-friction bearings interposed between the two concentric tubes, bearings such as ball-bearings 19 and 20.

The lower part of the tube 18 is provided with a half-drum 21 opened downwards and graduated in degrees on the outer cylindrical portion thereof. The half-drum 21 is superposed to a similar coaxial half-drum 22 opened upwards. Normally, the lower drum remains in a fixed position, but its position may be adjusted angularly relatively to a fixed mark so as to show the course of the flight; to this purpose it is provided with appropriate bearings lodged in the sextant casing, and the lower drum bears also on its cylindrical outer surface a degree gauge. The opposite half-drums 21 and 22 form an inner circular chamber wherein is comprised the lower end of the tube 18 which tube is provided with a toothed end-flange or crown 23. The bottom plate 24' of the lower half-drum 22 supports the inner tube 17. The latter tube comprises an optical system which may be constituted, for instance, by three appropriate lenses 24, 25 and 26, and this tube goes through the bottom plate 24' of the lower drum 22. On the other hand, the bottom plate 24' is provided with an excentrical aperture 27 through which passes a shaft 28 parallel to the axis of the tube 18 and bearing on its top a pinion 29 put in gear with the tooth-crown 23 of the tube 18. The lower end of the shaft 28 bears another pinion 30 in gear with the pinion 31 pivoting in a convenient manner round the extended axis of the optical system lodged in the tube 17; in this pinion 31 is set a Wellaston prism 32 disposed in extension of the same optical axis.

On the other hand, the pinion 31 is geared with the driving pinion 33 of the azimuth pointing set on the shaft 34 encased in an appropriate bearing inside of the sextant casing and controlled from outside by a roll-knob 35 also guided by a bearing fitted in the sextant casing, as schematically shown on the drawing in 36. The connection between the driving shaft 36 of the roll-knob 35 and the shaft 34 of the driving pinion 33 is preferably arranged by coupling an endless screw 37 with a cog-wheel 38.

Under the Wellaston prism is disposed the ocular contrivance of the periscopic device, this former contrivance may be constituted, for instance, by two successive lenses 39 and 40 followed by a reversing mirror 41, of another lens 42, a right angle reversing prism 43 and finally by the ocular lens 44.

On the other hand, the reversing mirror 41 may cooperate with another lens 42' and a second reversing mirror 45 to the effect of introducing in the optical system of the periscoping device an image of the air-bubble of a spirit level 46 which may serve as reference horizon.

It is evident that as another variant of embodiment of the invention, the spirit-level may be disposed directly in the optical axis of the device, or it may be substituted with a gyroscopic horizon device.

All the members of the optical device as described above, as well as their pinions and driving gear, are placed in a casing of an appropriate shape situated below the bottom plate 24' of the half-drum 22, but this casing is not figured on the drawing for the purpose of its better clearness.

It appears clearly from the above description that thanks to the location of the Wellaston prism 32 in the axis of the optical periscopic device and thanks to the possibility of its rotation round the said axis by means of the azimuth pointing driving-gear operated by the roll-knob, it becomes possible to point in all the azimuth directions by simply operating the search-prism 12 of the periscopic device by means of the above driving-gear; it results from this arrangement that the operator does not need to change his position around the device, as it must be generally done with the usual periscopic devices known up to now.

As regards the operation of the search-prism in sight-plane, i. e. round its horizontal shaft 13, this driving contrivance has been conceived taking into account a special difficulty which consists in measuring the angle of rotation of the prism 12 round the above horizontal axis 13 so as to give a reading, in a fixed point of the amount of this angular rotation, and this without preventing the search-prism 12 from the rotation in azimuth directions.

According to the present invention, the problem is solved by use of a metal wire 47 for operation of the angular rotation of the search-prism 12 in the sight-plane, the said metal wire 47 running over a pulley-block 50 which turns in azimuth directions simultaneously with the prism 12, whilst the metal wire is sent back over the pulley-block 51 with a fixed pin so as the wire between the two pulleys coincides with the axis of the periscopic device.

As is shown in Fig. 2 and in a more detailed manner on an enlarged scale in Fig. 3, the tension wire 47 of the search-prism 12 is attached to the edge 48 of a circular sector 49 on which the said wire winds itself up when the sector fastened to the search-prism 12 rotates with this latter around the shaft 13. The metal wire 47 runs over a pulley-block 50 borne by a frame 53 (Fig. 1) or a bracket 53' (Figs. 2 and 3) fastened to the turning plate 16 of the device. In this way, the pulley-block 50 turns in azimuth plane with the shaft 13 of the search-prism and consequently with the same search-prism around the vertical axis of the periscopic device, this pulley-block being so arranged as to guide the wire along this vertical axis to a second pulley-block 51 mounted on a fixed axis. The said wire is then taken over by a third pulley-block 52, equally mounted on a fixed axis, and fitted on the outside casing of the periscopic device and is then guided in parallel direction with the optical axis of the system to the lower part of the said device where it is fixed to a nut 54 the reciprocating movements of which are obtained by a screw-threaded spindle 55 supported in appropriate bearings in the casing of the periscopic device. The endless screw 55 is continued downward by a rod 56 bearing a gauged drum 57 and fitted at its lower end with pinion 58 in gear with a driving pinion 59 operated by the sight-plane adjustment knob 62 by means of a worm 61 and a worm wheel 60.

The sight position of the search-prism 12 can be shown by a hand 63 borne by the nut 54 and which slides in front of a straight gauge 64 graduated in angular degrees. The angular minutes may be read on the drum 57 which is provided with a special graduation gauge to this purpose. It is obvious that the graduations of the straight gauge and of the drum may be carried out in degrees and fractions of degrees, without departing from the spirit of the present invention.

In order to enable a longitudinal translation of the nut 54 without turning of the same a guide-rod 65 is fastened to the said nut and its both ends are engaged in appropriate guiding bush-bearings 66 and 67.

In view of tightening of any play and in order to assure a slackless tension of the wire, a spiral spring 68 of adjustable tension may be coiled around the shaft 13, one of the ends of the said spring being fastened on the same shaft and the opposite end of the spring being anchored to a fixed point in 69, as shown, the position of this anchorage point being adjustable at will.

The functioning of the driving gear of the sight position appears clearly from the above description: the observer turns the knurled-knob 62 of the sight position driving-gear, and by the intermediate of the pinions 58 and 59 he brings into rotation the screw 55. The nut 54 slides then along this screw and determines a corresponding shift of the wire 47 which, being fastened to the edge of the circular sector 49 and winding up on the latter calls forth an angular rotation of the search-prism proportionate to the gliding of the nut 54 and consequently also proportionate to the rotation of the screw 55. The gauge-drum 57 fastened to the screw 55 permits a direct reading of an angular rotation in the sight-plane of the search prism 12. The position of the nut 54 permits an approximate reading of the angle, say with 5° precision, for instance, a more precise reading in degrees and minutes will be taken from the gauge-drum.

The fact that the wire 47 is sent back of the pulley 50 exactly according to the direction of the main axis of the periscopic device, the pulley itself turning in azimuth plane round the same axis, it results from this disposition that an azimuth rotation of the search-prism does not involve any change in position of the wire, and consequently does not provoke any change of position of the said search-prism in the sight plane. In view of avoiding to break the wire, two turns in azimuth plane must not be exceeded.

Thus the device described constitutes a periscopic sextant in which the pointing is effected by means of rotation in azimuth and in sight-plane of a small search-prism placed under an optical dome and constituting a part of a periscopic device suspended by means of a universal joint in the shell of an airplane. This periscopic device is so arranged as to give the image of the planet pointed out, at a normal height of the fuselage and without obliging the observer to change his place. The height of the planet in question over the horizon is given by reference to the image of the air-bubble of the spirit-level or by reference to the gyroscopic horizon which are incorporated in the device. The reading consists in bringing the image of the planet to the center of the image of the air-bubble, or to the stabilized reticle of the gyroscope.

Although the invention has been described and represented specifically in the form of a periscopic sextant, it is understood that the invention is neither limited to this specific form of realisation, nor to this embodiment, but it may be reproduced and realised under other forms and for other purposes, and namely in order to constitute periscopic fire-aiming apparatus, periscopic pointing apparatus and periscopic drifting register apparatus.

What I claim is:

1. A periscope comprising an optical system having a normally vertical axis, a tubular member housing the upper portion of said system and means for rotating said member about said axis, a sight prism mounted for rotation about a horizontal axis atop said tubular member and in optical alignment with said optical axis and rotative with said tubular member, and means for effecting rotation of said sight prism about said horizontal axis comprising a pulley mounted over said prism and carried by said tubular member, said pulley being rotatable about a horizontal axis and being tangent to said optical axis, a cable passing partially around said pulley, a member secured integrally to said sight prism to which an end of said cable is attached at a point removed from said optical axis, and means for drawing the other end of said cable whereby said sight prism may be rotated about its horizontal axis.

2. In a device as set forth in claim 1 wherein the means for motivating the other end of said cable comprises a nut member to which said cable is attached, a screw passing through said nut, said screw being longitudinally fixed with respect to a relatively stationary base whereby rotation of said screw effects reciprocation of said nut, means for rotating said screw to effect said reciprocation, an indicator carried by said nut and fixed on a linear scale co-active therewith for indicating the extent of travel of said nut, and a circular scale carried by said screw and rotative therewith to indicate the degree of angular motion thereof.

3. A periscope according to claim 1, including a plurality of lenses underneath said sight prism and cooperating therewith, a reversing mirror cooperating with said last mentioned lenses, another lens cooperating with said reversing mirror, a second reversing mirror cooperating with said last mentioned lens, and a spirit-level cooperating with said last mentioned reversing mirror.

ROBERT LAVERDURE.

REFERENCES CITED

The following references are of record in the file of this patent:

UNITED STATES PATENTS

| Number | Name | Date |
|---|---|---|
| 649,046 | Fiske | May 8, 1900 |
| 829,121 | Neumayer et al. | Aug. 21, 1906 |
| 1,161,995 | Styll | Nov. 30, 1915 |
| 1,360,735 | Mazuel | Nov. 30, 1920 |
| 2,266,741 | Crane et al. | Dec. 23, 1941 |
| 2,399,676 | Holschub et al. | May 7, 1946 |

FOREIGN PATENTS

| Number | Country | Date |
|---|---|---|
| 274,912 | Great Britain | Jan. 25, 1929 |